No. 876,416. PATENTED JAN. 14, 1908.
R. F. S. VENNER & R. C. GRIESBACH.
ELECTRIC TIME SWITCH.
APPLICATION FILED FEB. 12, 1907.

6 SHEETS—SHEET 1.

WITNESSES:
H. J. Brockwell.
H. R. Forster.

INVENTORS
R. F. S. Venner
R. C. Griesbach
by J. Vetter
Attorney

No. 876,416. PATENTED JAN. 14, 1908.
R. F. S. VENNER & R. C. GRIESBACH.
ELECTRIC TIME SWITCH.
APPLICATION FILED FEB. 12, 1907.

6 SHEETS—SHEET 2.

WITNESSES:
H. J. Brockwell.
H. R. Forster.

INVENTORS
R. F. S. Venner
R. C. Griesbach

No. 876,416. PATENTED JAN. 14, 1908.
R. F. S. VENNER & R. C. GRIESBACH.
ELECTRIC TIME SWITCH,
APPLICATION FILED FEB. 12, 1907.

6 SHEETS—SHEET 4.

WITNESSES:
H. J. Brockwell.
H. R. Forster.

INVENTORS
R. F. S. Venner
R. C. Griesbach
by J. Fletter
Attorney

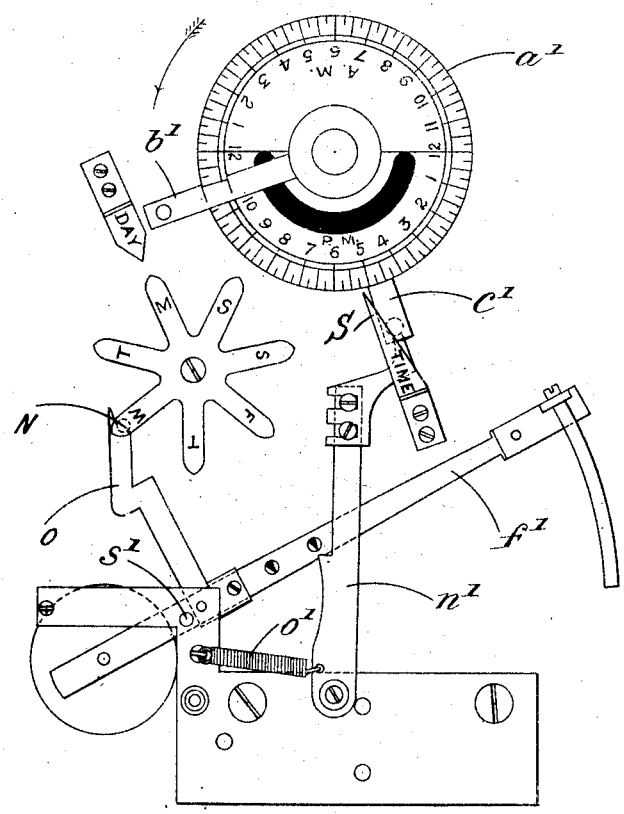

No. 876,416. PATENTED JAN. 14, 1908.
R. F. S. VENNER & R. C. GRIESBACH.
ELECTRIC TIME SWITCH.
APPLICATION FILED FEB. 12, 1907.
6 SHEETS—SHEET 6.
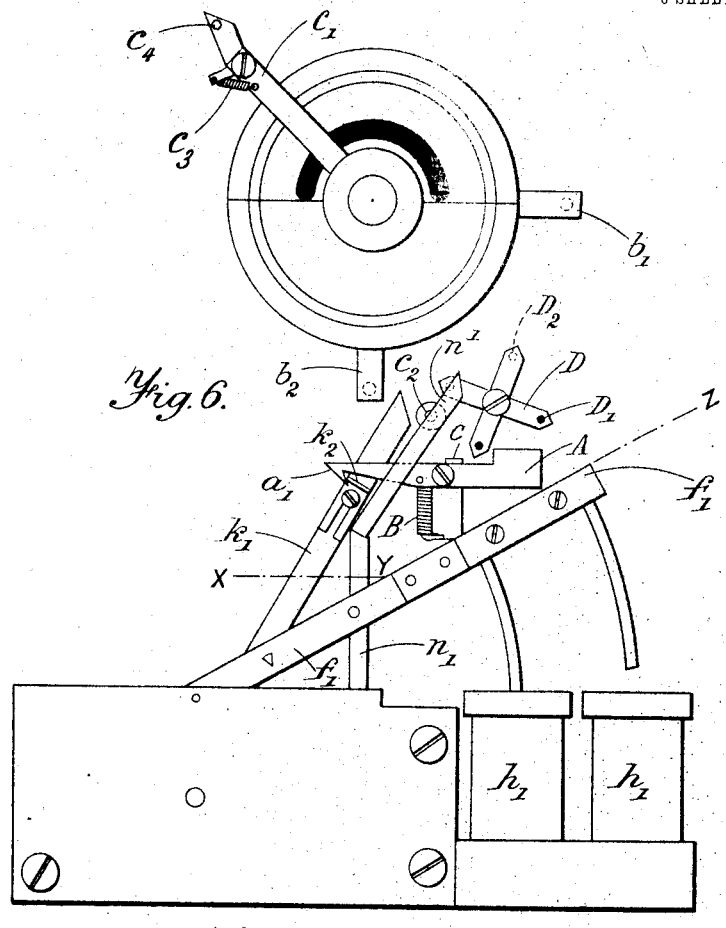
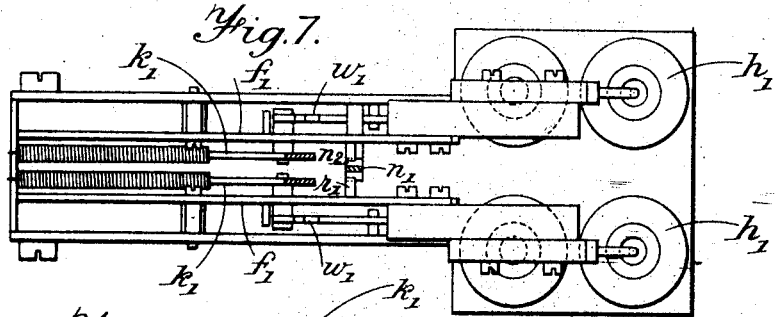
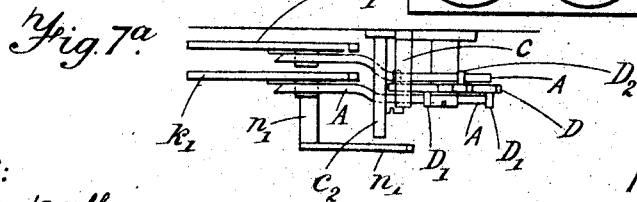
WITNESSES:
Henry J. Brockwell.
H. R. Forster.
INVENTORS:
R. F. S. Venner
R. C. Griesbach
by J. Walter Attorney

UNITED STATES PATENT OFFICE.

ROBERT FRANCIS SIDEBOTTOM VENNER AND ROBERT CONSTANTINE GRIESBACH, OF LONDON, ENGLAND.

ELECTRIC TIME-SWITCH.

No. 876,416.  Specification of Letters Patent.  Patented Jan. 14, 1908.

Application filed February 12, 1907. Serial No. 357,010.

*To all whom it may concern:*

Be it known that we, ROBERT FRANCIS SIDEBOTTOM VENNER and ROBERT CONSTANTINE GRIESBACH, subjects of the King of the British Dominions, residing at London, England, have invented certain new and useful Improvements Relating to Electric Time-Switches, of which the following is a specification.

This invention relates to that class of electric time switches, which comprise a clockwork, a dial, and two or more hands adapted to be turned by the clockwork and to periodically act on a mechanism which serves for completing and breaking an electric circuit or several circuits at predetermined times.

Our improvements chiefly relate to the mechanism, which is operated by the clockwork so as to complete and break an electric circuit or circuits at the desired time, usually at every revolution of the clock-hands. They also comprise a selective device, which is used, when it is desired, to suspend or partly suspend the operation of the switch at intervals of time, for instance every Sunday.

Our improvement will be hereafter fully described with the aid of the accompanying drawings and specified by the claims.

Figure 1:
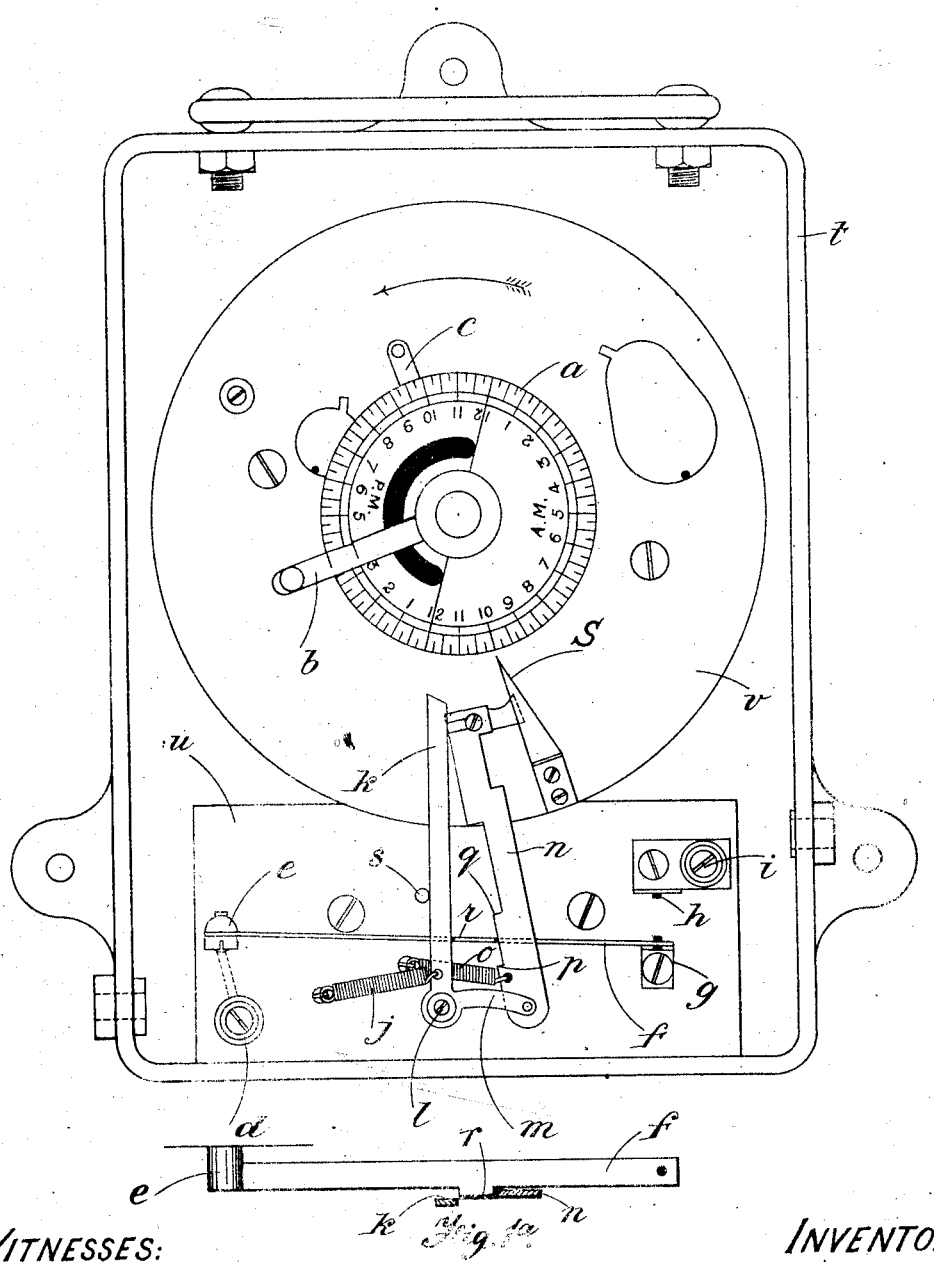
Figure 2:
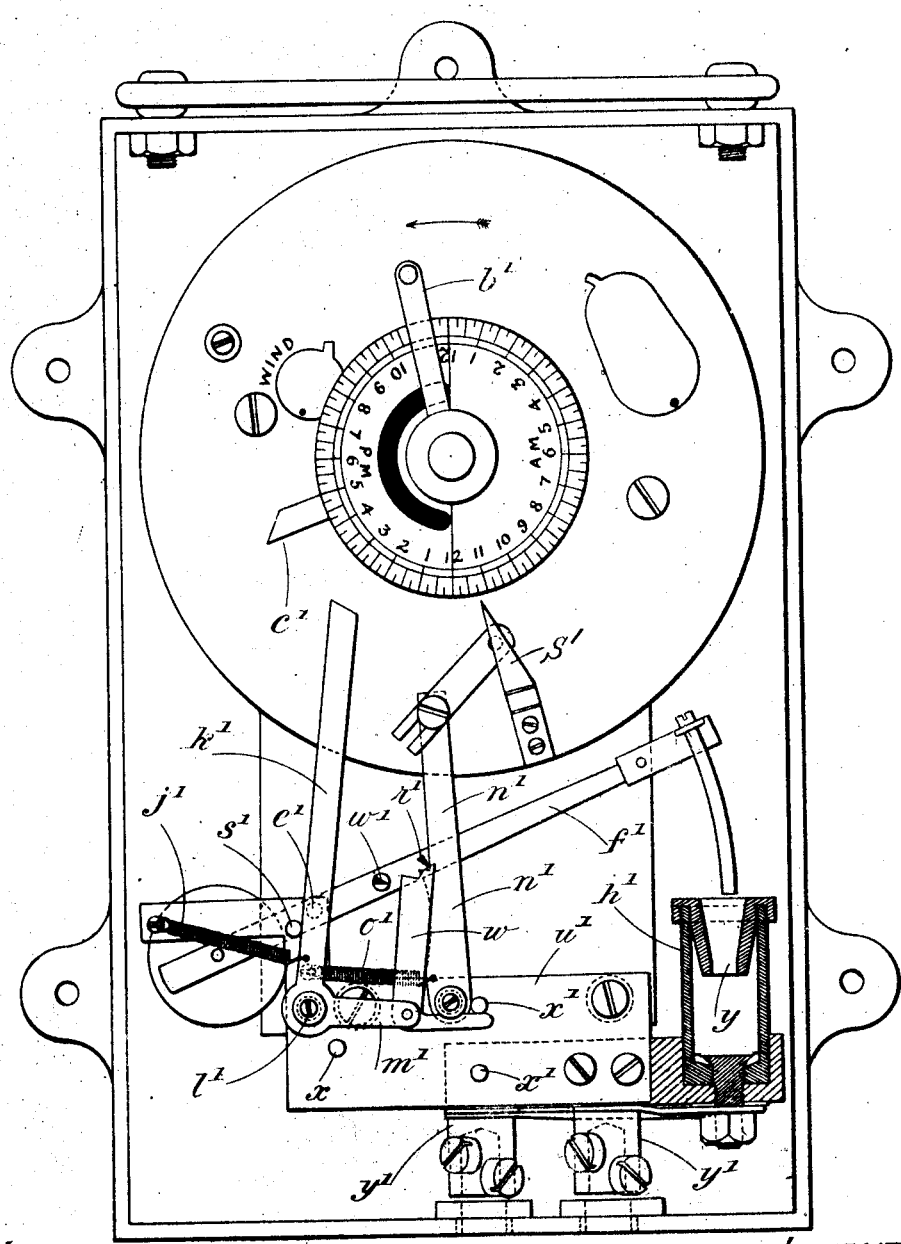
Figure 3:
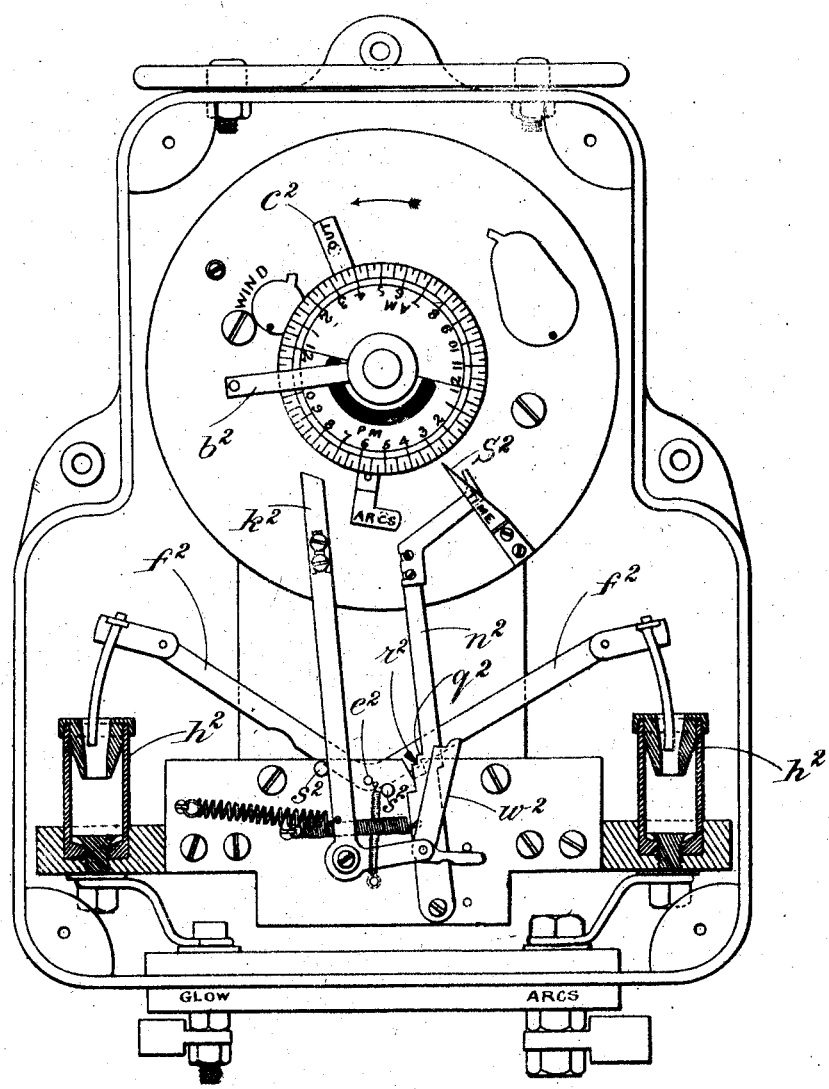
Figure 4:
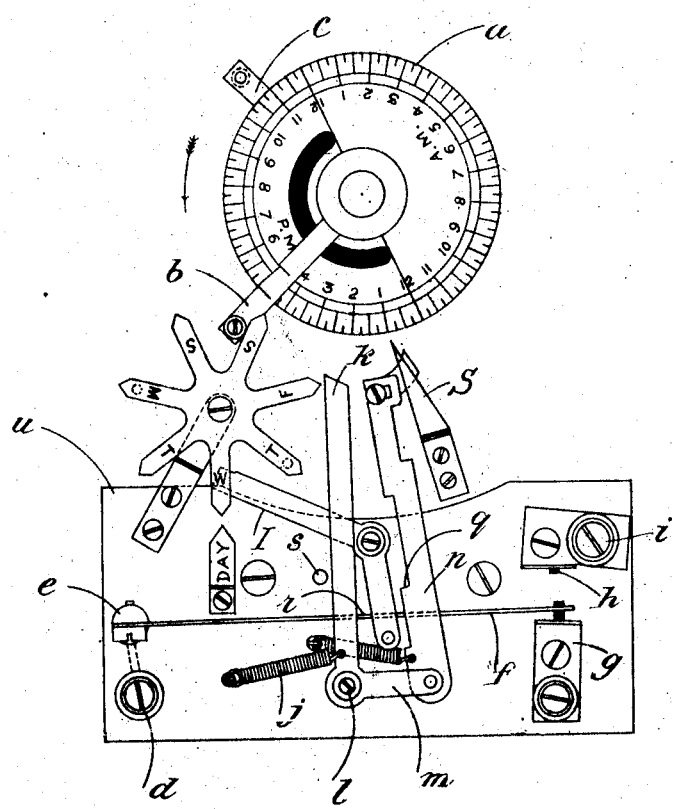

In the drawings Figure 1 is a face view of a time switch embodying our invention, and provided with platinum contacts. Fig. 1ª is a plan of the contact lever $f$ shown in Fig. 1. Fig. 2 is a face view and partial section of a time switch with a pair of mercury contacts, for alternately completing and breaking an electric circuit. Fig. 3 is a face view of a switch provided with two pairs of mercury contacts belonging to two electric circuits. Fig. 4 is a face view of a switch provided with a selective device applied to the type of switch shown by Fig. 1. Fig. 5 shows the application of a selective device to a switch of the type represented by Fig. 2. Figs. 6, 7 and 7ª show a modification of the type shown by Fig. 2. Fig. 6 is a face view of a time switch for opening and closing two electric circuits by means of two pairs of mercury contacts, a pair of parallel contact levers and a special auxiliary device. Fig. 7 is a sectional plan along line X—Y—Z of Fig. 6. Fig. 7ª is a plan of the auxiliary device shown in Fig. 6.

The clock dial $a$ Fig. 1 is divided into two halves, one of which is marked with the 12 hours between midnight and noon, while the other is used for the period between noon and midnight and distinguished from the first by a black semi-circle. The clock-hands $b$ and $c$ are mounted on the clockwork axle on opposite sides of the dial; they are adjustable independently of each other and may be secured at any desired radius of the dial, preferably by means of an enlarged boss and a screw nut.

The electric circuit includes a terminal $d$ connected with the pivot $e$ of a contact lever $f$, which in the present case is a flexible metal strip carrying at its extremity a platinum contact resting on a stop-abutment $g$, and a stationary platinum contact $h$ connected with the other terminal $i$. The stop abutment $g$ may also have a platinum contact and be connected with a third terminal, so that the motion of the contact lever $f$ between the contact $h$ and the stop-abutment $g$ may alternately open and close two circuits.

The intermediate mechanism which controls the position of the contact lever $f$ under the influence of the clock-hands chiefly comprises a bell-crank lever $k$, $m$, pivoted at $l$ and a retaining lever $n$, which has its fulcrum on the extremity of the short arm $m$ of the bell crank lever $k$, $l$. These two levers are movable in parallel planes, the extremity of the long arm $k$ of the bell crank lever being situated in the path of the stud fixed on the clock-hand $b$, and the free end of the lever $n$ being in the path of the stud mounted on the clock-hand $c$, so that the said levers will be turned forward by the respective clock-hands at the desired time, and thereby stretch the springs $j$ and $o$, which are arranged so as to pull the levers back into their position of rest, as soon as they are released by the clock-hands. On the side next to the lever $k$ the lever $n$ has a shoulder or step $p$ and a shoulder or step $q$, and the contact arm $f$ has a short lateral extension or widened part $r$, placed in the plane of motion of the lever $n$ and adapted to engage with the steps $p$ and $q$. The return motion of the lever $k$ under the influence of the spring $j$ is limited by a stop-pin $s$. The terminals $d$, $i$, contact lever $f$, stop-abutment $g$ and levers $k$, $n$, together with their springs and stop-pin are mounted on a base plate $u$, of insulating material, screwed to the main frame or casing $t$.

$o$ is an index hand, showing the point where the lever $k$ will be released by the hand $b$; $v$ is the cover plate of the clock work casing. The clock-hand $b$ serves to complete the circuit passing through the terminals $d$ and $i$, for instance an electric lighting circuit, and the clock-hand $c$ serves to break it.

The entire apparatus works as follows:— The clock-hands are set to the desired radius of the dial and then fixed and the clock-work set in motion. The clock hands will then revolve in the direction of the arrow; at the proper time the stud of the hand $b$ will meet the lever $k$ and turn it slowly, while storing up energy in the spring $j$. At the same time the short arm $m$ will draw the lever $n$ downward, while the spring $o$ keeps it in contact with the edge of the strip or enlargement $r$. Consequently the step $q$ will be situated below the said strip, before the hand $b$ releases the lever $k$. When this takes place, the spring $j$ pulls the lever $k$ back rapidly, the lever $n$ ascends bodily and lifts the contact lever $f$ rapidly, so as to abut against the fixed contact $h$ and close the lighting circuit. The shoulder $q$ keeps the lever $f$ in this position, until the lever $n$ is turned by the releasing clock-hand $c$. A short turn of the lever $n$ releases the strip $r$ from the step $q$ and allows the lever $f$ to drop, thereby breaking the circuit.

In the modification represented by Fig. 2 the current is led through a pair of terminals $y^1, y^1$, to a pair of mercury cups $h^1$ placed one behind the other in close proximity to each other, (only one of them is seen in the drawing), so that they can be easily bridged over by a fork fixed to the contact rod $f^1$ but insulated from the same, the said fork having a pair of curved prongs, each of which dips into one of the mercury cups $h^1$. Each of the said cups is closed by a funnel-shaped lid $y$ extending into the cup, but not touching the mercury. The orifice of the said funnel is only large enough to allow the fork to pass easily; consequently, the spark formed, when the prong leaves the mercury, will be extinguished by the pressure of the mercury vapor, before the end of the fork leaves the orifice of the funnel. The funnel also prevents the spilling of mercury.

As shown by the drawing, the group of contact rods at the end of the lever $f^1$ are curved from the fulcrum $e^1$ of the said lever as a center, in order to reduce as much as possible the clearance between the said rods and the orifices of the funnel-shaped lids $y$. The rigid contact lever $f^1$ is pivoted at $e^1$ and carries on its rear extension a balance weight. Instead of the lateral extension $r$ it has a knife edge $r^1$ and in addition a second knife edge $w^1$, while the short arm $m^1$ of the starting or bell-crank lever $k^1$, $m^1$ carries the fulcrum of a two-armed pawl $w$, the upper end of which forms a knife rest for the knife edge $w^1$. The knife edge $r^1$ finds a support on a step formed on the side of the releasing lever $n^1$.

The drawing shows the mechanism in the position, which it assumes, after the contact lever has been lifted and the working circuit broken. In this position the lever $f^1$ is supported by the knife edge $r^1$ and the step formed on the side of the retaining lever $n^1$, which has its fulcrum on the base plate $u^1$. As soon as the clock-hand $c^1$ reaches the stud mounted on the upper end of the retaining lever $n^1$, the latter will be turned forward, away from the knife edge $r^1$, and allow the lever $f^1$ to drop by is own weight, so as to close the electric ciruit. As the clock-hands continue to turn, the hand $b^1$ will meet the lever $k^1$ and turn it forward slowly, while stretching the spring $j^1$. The pawl $w$ will descend with the arm $m^1$ until it meets the lower one of the two stop-pins $x^1$, which causes the pawl $w$ to turn, so as to place it underneath the knife edge $w^1$. As soon as the arm $b^1$ leaves the bell-crank lever $k^1$, (whose downward motion is limited by a stop-pin $x$) the spring $j^1$ will turn the lever $k^1$ backward, the pawl $w$ will lift the knife edge $w^1$ together with the lever $f^1$ and break the circuit. When the short arm of the pawl $w$ touches the upper one of the stop-pins $x'$, the pawl will turn away from the knife edge $w^1$ and allow the lever $f^1$ to drop slightly, until the knife edge $r^1$ is supported by the lever $n$, which is constantly drawn towards the knife edge by the spring $o^1$. The mechanism will therefore again assume the position shown in Fig. 2.

As shown by the drawing, the retaining lever $n^1$ is preferably composed of two parts, secured together by a screw and a slot, to render the total length of the said lever adjustable.

The electric time switch represented by Fig. 3 is adapted to open and close two circuits, for instance, for exchanging from an arc lamp circuit to an incandescent circuit and vice-versa. For this purpose the contact lever $f^2$ has two arms placed symmetrically to the fulcrum $e^2$, each arm carrying a fork dipping into a pair of mercury cups $h^2$ and a third hand equally adjustable as the others, is mounted on the axle of the time disk for the purpose of giving an intermediate position, when neither contact is desired to be made. In this position, shown by the drawing, the contact lever $f^2$ is held by a second knife rest situated lower than the knife rest $q^2$. If the clock is set in motion or continues to move, the clock-hand for the arc-lamps will meet the lever $n^2$ and turn it away from the knife edge $r^2$ supported by the second knife rest or step, thereby allowing the lever $f^2$ to drop and make contact with the mercury forming part of the circuit which includes the arc lamp, while the glow lamp circuit remains broken. As the clock continues to move, the arm $b^2$ controlling the glow lamp circuit reaches the lever $k^2$ and turns it forward slowly, thereby causing the pawl $w^2$ to descend and turn. As soon as the clock-hand releases the lever $k^2$, the latter is drawn back rapidly by the spring $j^2$, and the pawl $w^2$ lifts the knife edge $r^2$, together with the right arm of the lever $f^2$, while causing the left arm to drop and close the glow lamp circuit. The knife edge $r^2$ will now rest on the first or uppermost step of the lever $n^2$, until the third clock-hand meets the retaining lever $n^2$ and turns it away from the knife edge, but immediately afterwards releases the lever $n^2$. The lever $n^2$ will therefore only turn far enough to allow the knife edge $r^2$ to drop to the second knife rest, and regain the position shown by the drawing.

The motion of the lever $k^2$ is limited by a pair of stop-pins $s^2$, $s^2$, and the right arm of the lever $f^2$ viz: that which carries the knife edge, is drawn downward by a helical spring placed near the fulcrum $e^2$, as shown by the drawing.

Where it is necessary to interchange two circuits, but not necessary to have an intermediate neutral position, this may, of course, be accomplished by omitting the third hand and the lower knife rest.

It is obvious, that instead of mounting a pair of arms on the same axle of the clockwork, they may be mounted on separate axles, which are geared together.

The modification represented by Figs. 6, 7 and 7ª serves to open and close two circuits alternately in a special manner. It comprises two pairs of mercury contacts $h_1$ placed one behind the other, a pair of contact levers $f_1$ placed parallel to each other, a pair of parallel starting levers $k_1$, a double-acting releasing lever $n_1$, a pair of pawls $w_1$, 3 clock hands or revolving arms $c_1, b_1, b_2$ and a special auxiliary device hereafter described. Instead of a knife edge $r_1$, Fig. 2, each of the two contact levers $f_1$ has a stud $r_1$ extending horizontally from its inner face, and instead of knife rests the releasing lever $n_1$ situated between the contact levers, has a pair of spring-lugs $n_2$ adapted to support the said studs $r_1$. Each of the starting levers $k_1$ has a lateral rib $k_2$ to engage with a hook $a_1$ formed on a lever or pawl A actuated by a spring B. The special releasing device mentioned above consists of a four-armed wheel D mounted above the pawl A and adapted to revolve on its horizontal axis in a vertical plane situated between the pawls A, as indicated by Fig. 7ª. Each arm of the said wheel D carries a stud, two ($D_1$) extending from the front and two ($D_2$) extending from the back of the wheel, so as to act on the heel-ends of the pawls A alternately.

The action of the switch is as follows:—

The time dial and the three hands all revolve as solid, under the influence of the clockwork, until the small tripper piece on the arm $c_1$ is arrested by the peg $c_2$, the clock going on running then puts tension on the small spring $c_3$, at the same time sliding the tripper piece along the peg, until it finally slips off same and takes up its original position. During this movement the peg $c_4$ engages with the lever $r_1$ and carries it forward, thus removing the spring lugs $n_2$ from under the studs $n_1$ and allowing the contact levers $f_1$ to fall into the mercury cups. The dial continues to revolve and brings the peg in the hand $b_1$ into engagement with the two starting levers $k_1$ and carries them forward, until the lateral ribs $k_2$ engages with the hooks $a_1$ formed in the levers A; a continuation of the movement of the hand $b_1$ causes it to engage with one of the spokes of the star wheel, and on turning this wheel one of the pins $D_1$ and $D_2$ engages with its respective lever (A). In the instance shown by the drawing, one of the pegs $D_1$ will be next in position; as this peg is projecting forward, it follows that the near side lever A will be the first to be tripped, the hand $b_2$ follows round in due course and engages with the star wheel, this time the back lever A is tripped, releasing the second starting lever and bringing the second contact lever $f_1$ out of the mercury. This sequence is again carried out the next day, but the first peg to present itself is projecting towards the back, thus tripping first the starting lever, that on the day before was the last to be tripped. Above the said levers A is mounted a star wheel D having 2 arms with studs $D_1$ in front and two arms with studs $D_2$ at the back. If the two contact levers are in the elevated position, supported by the lugs $n_2$ of the lever $n_1$ and then the long clock hand $c_1$ turns the arm $n_1$ forward, the contact levers will drop at the same time, and close the two circuits.

When the stud at the rear of the clock hand $b_1$ reaches the arm of the star-wheel and turns it, the stud mounted on the diametrically opposite arm of the star-wheel depresses the heel of the first hook lever A, thereby lifting the hook and releasing the first starting lever $k_1$, which is then drawn to the left by its spring, and the pawl pivoted to the short arm of the first starting lever (as in Fig. 2) lifts the first contact lever out of its mercury cups. When the clock arm $b_2$ reaches the star-wheel, it depresses the second hook lever, thereby releasing the second starting lever and lifting the second contact lever out of its mercury cups. When on the following day the long clock-hand again reaches the releasing lever, the two contact levers will drop at the same time. Subsequently the clock-hand $b_1$ will turn the star-wheel, thereby acting on the second hook lever and opening the second circuit. At the desired time the other short clock hand $b^2$ will act on the star-wheel, thereby releasing the first hook lever and opening the first circuit. If the two circuits serve to light two series of arc lamps, the lamps will therefore be lighted at the same time, and extinguished at different times. For instance on the first, third and fifth day the first series will be extinguished early and the second series late, while on the second, fourth and sixth day the second series will be extinguished early and the first late, and so on in alternation.

In certain cases, for instances, when the electric time switch is used for alternately completing and breaking an electric lighting circuit, it is desired to suspend or modify its operation at certain intervals, for instance every Sunday. For this purpose we employ a selective device, which is propelled a given distance at every revolution of the clock-hands, and resumes its original position by the seventh revolution of the same. In six of its positions the said selective device does not act on the circuit closing device, but in the seventh position it locks the same, so that the circuit cannot be completed, until the selective device has again been displaced by the subsequent revolution of the axle carrying the clock-hands. For the sake of simplicity one of the clock-hands, which controls the circuit-closing device mentioned above, is used for setting the selective device, and the latter chiefly consists of a seven-armed star-wheel, although an endless belt provided with seven arms may be used.

Fig. 4 shows a selective device applied to a platinum contact switch of the type shown by Fig. 1.

Each of the arms of the star-wheel is marked with the initial of the corresponding week day. Two of the arms (T and M) are provided with studs (shown in dotted lines), which on the selected days act on one arm of an intermediate lever I, so as to press with its other arm against the contact lever $f$ and hold the latter clear of the lateral projection $r$ of the same. Consequently, when the lever $n$ rises (after the lever $k$ has been released by the arm $b$) it cannot lift the lever $f$, so as to touch the contact $h$. When the star-wheel is again turned by the clock-hand $b$, the lever I is released and returns to the position of rest shown by Fig. 4, in which position the lever $n$ is free to act as in Fig. 1.

Fig. 5 shows the application of the star-wheel to a switch of the type represented by Fig. 2. The arm W of the star-wheel has a stud N, and an arm O is fixed to the contact lever $f^1$ at right angles to the same, the free end of the arm O being placed in the path of the stud N and adapted to engage with the same, when the star-wheel occupies a given position, so that the star-wheel prevents the lever $f^1$ from dropping from its elevated position and making contact with the mercury. During the subsequent revolution of the clock-hands the star-wheel is again turned one division and releases the arm O. The star-wheel may have pegs on two or more of its arms, in case its normal operation is to be suspended more frequently.

One of the principal results of our improvements in comparison with the electric time switches previously known is, that the switch mechanism opposes less resistance to the motion of the clock, and the latter is therefore not liable to derangement or to become inaccurate.

Our switch also insures a rapid completion and breaking of circuits, it reduces the sparking to a minimum and has a comparatively small number of parts.

What we claim is:—

1. An electric time switch comprising in its construction a clockwork provided with a dial, a plurality of clock-hands adapted to turn on the axis of the dial and adjustable in relation to the latter, a pair of operating levers adapted to be turned in one direction by the revolving clock-hands and in the opposite direction by springs, one lever normally being placed in the path of one clock-hand and the other being placed in the path of another clock-hand, a contact lever movable within given limits in a plane parallel to the operating levers, and an electric circuit adapted to be alternately closed and broken by the said contact lever, the first of the said operating levers being shaped as a bell-crank lever and adapted to place the contact lever in one of its extreme positions by spring power, after the corresponding clock-hand has released the said lever, and the second operating lever being adapted to support the contact lever in one of its extreme positions, until it is turned by another clock-hand, substantially as described.

2. In an electric time switch, the combination of an electric working circuit and a clock having a plurality of adjustable clock-hands, with a contact lever having a device for alternately closing and breaking the said working circuit and a device for retaining the contact lever in one of its extreme positions, a two-armed starting lever adapted to be turned slowly in one direction by one of the clock-hands, while storing up energy in a spring, and on its release from the said clock-hand to turn the contact lever rapidly under the influence of the said spring, a retaining lever placed within the reach of the second clock-hand and adapted to support the contact lever in its new position (due to the operation of the starting lever), until the retaining lever is turned by the second clock-hand, and a spring adapted to replace the retaining lever in its starting position, substantially as described.

3. In an electric time switch having a contact lever with mercury contacts adapted to alternately complete and break an electric circuit, and a plurality of revolving clock-hands adapted to control the position of the said contact-lever through suitable intermediate mechanism, the combination of a contact lever having a knife edge extending from the side of the same, with a bell-crank lever adapted to be turned forward slowly between given limits by one of the revolving clock-hands, a spring adapted to withdraw it rapidly, when released by the clock-hand, a pawl pivoted to the short arm of the bell-crank lever and movable within given limits, a retaining lever having its free end placed within the path of the second clock-hand, and a spring adapted to oppose the forward motion of the retaining lever and to withdraw it rapidly after its release from the clock-hand, the upper end of the pawl forming a knife rest adapted to lift one of the said knife edges together with the contact lever, when the bell-crank lever is released, and the side of the retaining lever having a knife rest adapted to support the contact lever in the elevated position until the retaining lever is turned by the clock, substantially as described.

4. An electric time switch comprising in its construction a clockwork provided with a dial, a pair of clock-hands adapted to turn on the axis of the dial, an electric operating circuit including a pair of mercury cups, a contact lever having a pair of contact rods adapted to complete the electric circuit by dipping into the said mercury cups, mechanism intermediate the clockwork and the contact lever, adapted to be turned forward slowly by one of the revolving clock-hands and then to lift the lever rapidly under the influence of a spring so as to break the electric circuit, and a lever intermediate the clock-work and the contact lever adapted to support the contact lever in its elevated position under the influence of a spring, and then to be turned forward by the other clock-hand so as to release the contact lever and allow it to drop, substantially as described and for the purpose specified.

5. An electric time switch comprising in its construction an electric working circuit having for its terminals a pair of mercury cups in proximity to each other, a clockwork with a pair of revolving clock-hands, a contact lever having at its free end a pair of rods adapted to dip into and rise out of the said mercury cups, a two-armed starting lever, adapted to be turned slowly in one direction by one of the clock-hands, while accumulating energy in a spring, and on its release to lift the contact lever under the influence of the said spring, a retaining lever placed within the path of the second clock-hand and adapted to support the contact lever in the elevated position until the retaining lever is turned by the said clock-hand, and a spring adapted to replace the retaining lever into its working position, after it has been released by the clock-hand, substantially as described.

6. An electric time switch comprising in its construction a clockwork provided with a dial, a pair of clock-hands adapted to turn on the axis of the dial and adjustable in relation to the same, an electric operating circuit, a contact lever adapted to alternately open and close the said circuit, a pair of operating levers adapted to be turned in one direction one after the other by the revolving clock-hands and then to be replaced into the starting position by springs, one of the said levers normally being placed in the path of one of the said clock-hands and the other in the path of the other clock-hand, a contact lever placed approximately at right angles to the said operating levers and movable within given limits, an electric circuit adapted to be alternately closed and opened by the said contact lever, one of the said operating levers being adapted after its release from the clock-hand, to change the position of the contact lever by spring power, and the second operating lever being adapted to subsequently support the contact lever in the new position, until the second operating lever is turned by the clock-hand, a selective device comprising a wheel adapted to be turned a given fraction of a circle by each revolution of the clock-hands, and an intermediate device adapted to control the position of the contact lever, so as to prevent the second operating lever from acting on the same when the clock-hands have made a given number of revolutions, and to be set out of action by the subsequent revolution of the clock-hands, substantially as described.

7. In an electric time switch the combination of an electric circuit, with a contact lever adapted to open and close the same alternately, a clockwork having a plurality of clock-hands, a starting lever adapted to be turned forward slowly by one of the said clock-hands, and thereby to change the position of the said contact lever, a spring adapted to accumulate energy by the forward motion of the said clock-hand and then to draw the starting lever backward, a retaining lever adapted to be turned forward by another of the said clock-hands and provided with a support adapted to retain the contact lever, and a spring adapted to draw the retaining lever backward, substantially as described and for the purpose specified.

In testimony whereof we have set our hands hereunto in the presence of two subscribing witnesses.

ROBERT FRANCIS SIDEBOTTOM VENNER.
ROBERT CONSTANTINE GRIESBACH.

Witnesses:
H. D. JAMESON,
F. L. RAND.